(12) United States Patent
Hatt et al.

(10) Patent No.: US 12,715,575 B2
(45) Date of Patent: Aug. 25, 2026

(54) METHOD FOR MANUFACTURING A DIAPHRAGM HOLDER FOR AN OLEO-PNEUMATIC SHOCK ABSORBER

(71) Applicants: SAFRAN, Paris (FR); SAFRAN LANDING SYSTEMS, Velizy-Villacoublay (FR)

(72) Inventors: Alexandre Hatt, Moissy-Cramayel (FR); Sylvain Didier Leclercq, Moissy-Cramayel (FR); Quentin Roirand, Moissy-Cramayel (FR); Mathieu Joubert, Moissy-Cramayel (FR)

(73) Assignees: SAFRAN, Paris (FR); SAFRAN LANDING SYSTEMS, Velizy-Villacoublay (FR)

( * ) Notice: Subject to any disclaimer, the term of this patent is extended or adjusted under 35 U.S.C. 154(b) by 377 days.

(21) Appl. No.: 18/294,450

(22) PCT Filed: Jul. 22, 2022

(86) PCT No.: PCT/FR2022/051471
§ 371 (c)(1),
(2) Date: Feb. 1, 2024

(87) PCT Pub. No.: WO2023/012420
PCT Pub. Date: Feb. 9, 2023

(65) Prior Publication Data

US 2024/0336355 A1 Oct. 10, 2024

(30) Foreign Application Priority Data

Aug. 2, 2021 (FR) ...................................... 2108410

(51) Int. Cl.
*B64C 25/60* (2006.01)
*F16F 9/32* (2006.01)
*F16F 15/023* (2006.01)

(52) U.S. Cl.
CPC ............ *B64C 25/60* (2013.01); *F16F 9/3207* (2013.01); *F16F 15/0232* (2013.01)

(58) Field of Classification Search
CPC ..... B64C 25/60; F16F 9/3207; F16F 15/0232; F16F 9/3221; F16F 9/063
(Continued)

(56) References Cited

U.S. PATENT DOCUMENTS 1,317,414 A * 9/1919 Atkinson .................. B64F 1/06 244/63
3,020,981 A * 2/1962 Day ....................... B60G 13/08 244/104 FP
(Continued)

FOREIGN PATENT DOCUMENTS

| | | | |
|---|---|---|---|
| FR | 2999528 | A1 | 6/2014 |
| FR | 3102522 | A1 | 4/2021 |
| WO | 2021083913 | A1 | 5/2021 |

OTHER PUBLICATIONS

Search Report and Written Opinion issued in International Application No. PCT/FR2022/051471, mailed Nov. 21, 2022.
(Continued)

*Primary Examiner* — Muhammad Ijaz
(74) *Attorney, Agent, or Firm* — Bookoff McAndrews, PLLC

(57) ABSTRACT

A method for manufacturing a diaphragm holder for a shock absorber of the oleo-pneumatic type, in particular for an aircraft landing gear. The diaphragm holder includes a first end with a dome, and a tubular portion extending from the dome to a second end. The method includes a step of overmolding a first material onto an insert. The insert can be
(Continued)

a second material with a value of compression breaking stress divided by density that is higher than the first material or alternatively, of a material identical to the first material. A diaphragm carrier which can be manufactured by this method.

22 Claims, 10 Drawing Sheets

(58) Field of Classification Search
USPC .......................................................... 267/136
See application file for complete search history.

(56) References Cited

U.S. PATENT DOCUMENTS 3,140,084 A * 7/1964 Schmidt .................. B64C 25/60 244/104 FP
3,997,133 A * 12/1976 Fagan ..................... B64C 25/60 244/100 R
4,746,086 A * 5/1988 Happ .................... B64C 25/001 244/104 R
8,020,807 B2 * 9/2011 Bachmeyer ............... F16F 7/02 244/102 R
8,087,610 B2 * 1/2012 Martin .................... B64C 25/60 244/102 SL
12,385,544 B2 * 8/2025 Leclercq ............... F16F 9/3207
2013/0260167 A1 * 10/2013 Kobayashi ............ F16F 9/3235 428/614
2022/0364626 A1 * 11/2022 Leclercq ............... F16F 9/3207
2022/0364627 A1 * 11/2022 Leclercq ............... F16F 9/3207
2022/0397176 A1 * 12/2022 Wallén .................. F16K 15/066
2022/0403904 A1 * 12/2022 Leclercq ................. B64C 25/60
2023/0038683 A1 * 2/2023 Henrion ................ F16F 9/3292
2024/0336355 A1 * 10/2024 Hatt ...................... F16F 9/3221

OTHER PUBLICATIONS

Search Report issued in French Application No. 2108410, mailed May 4, 2022.

* cited by examiner

[Fig. 1]
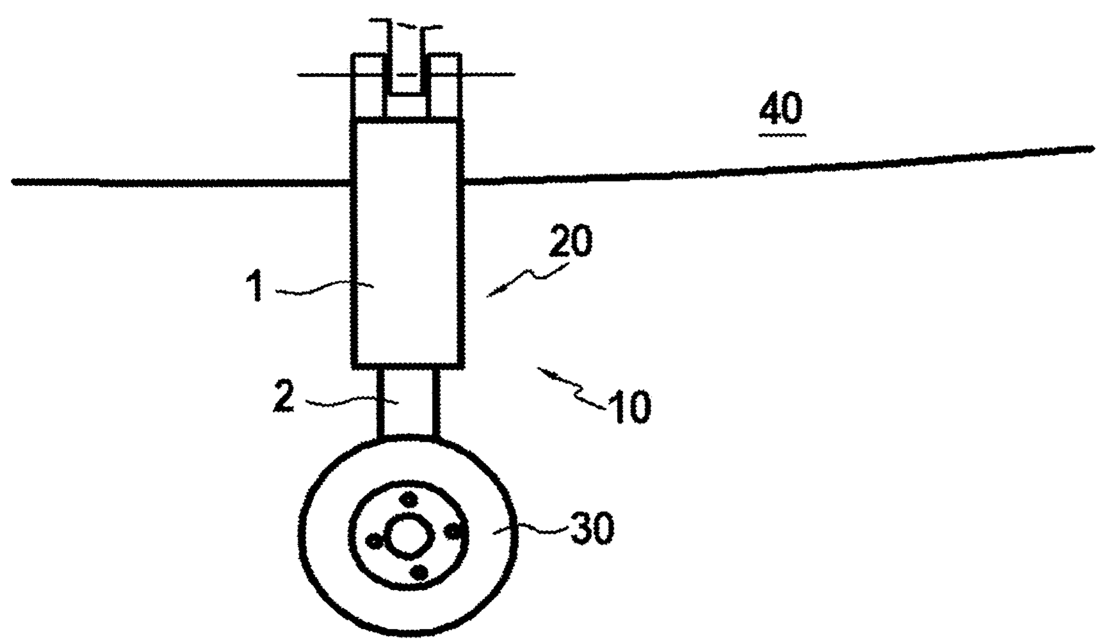

[Fig. 2]
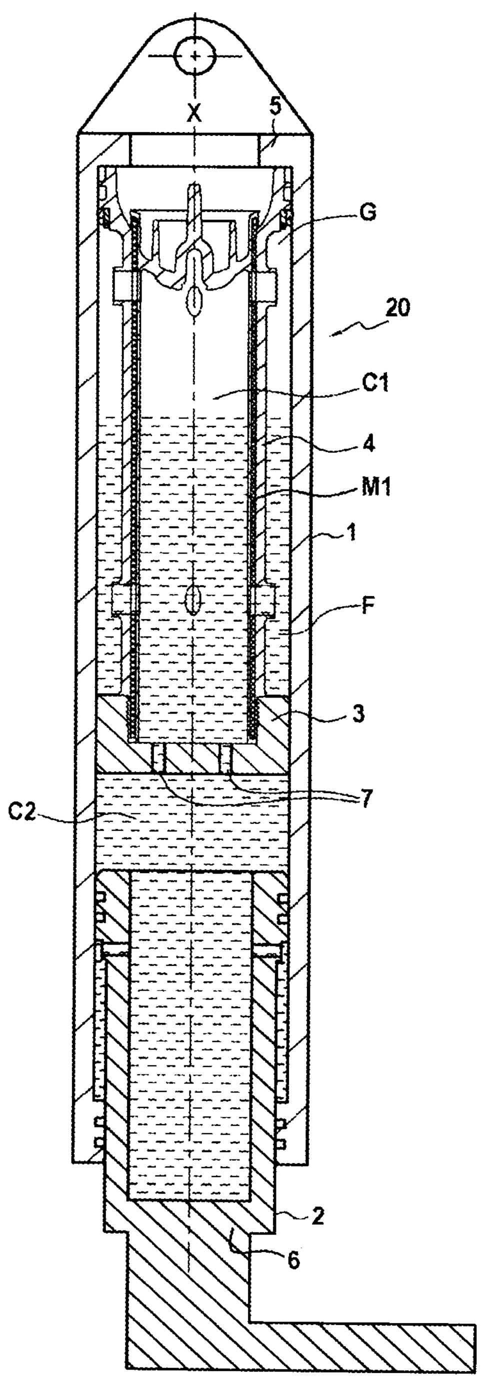

[Fig. 3]
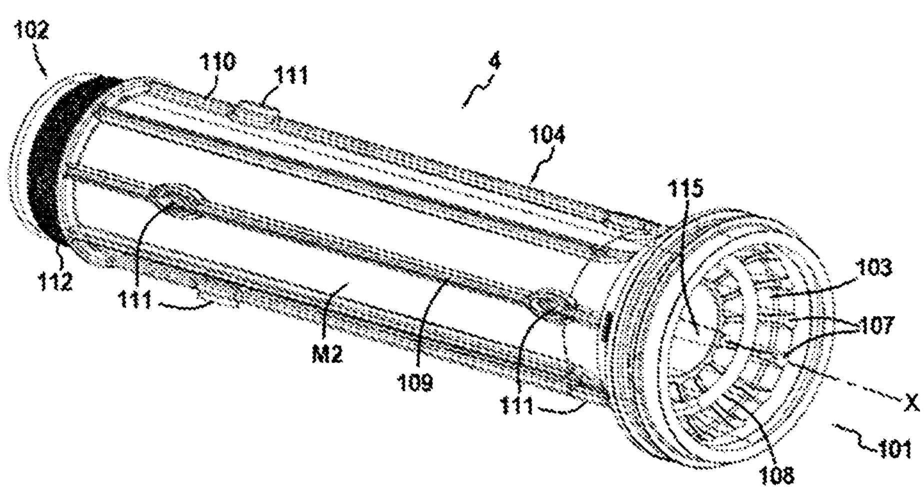

[Fig. 4]
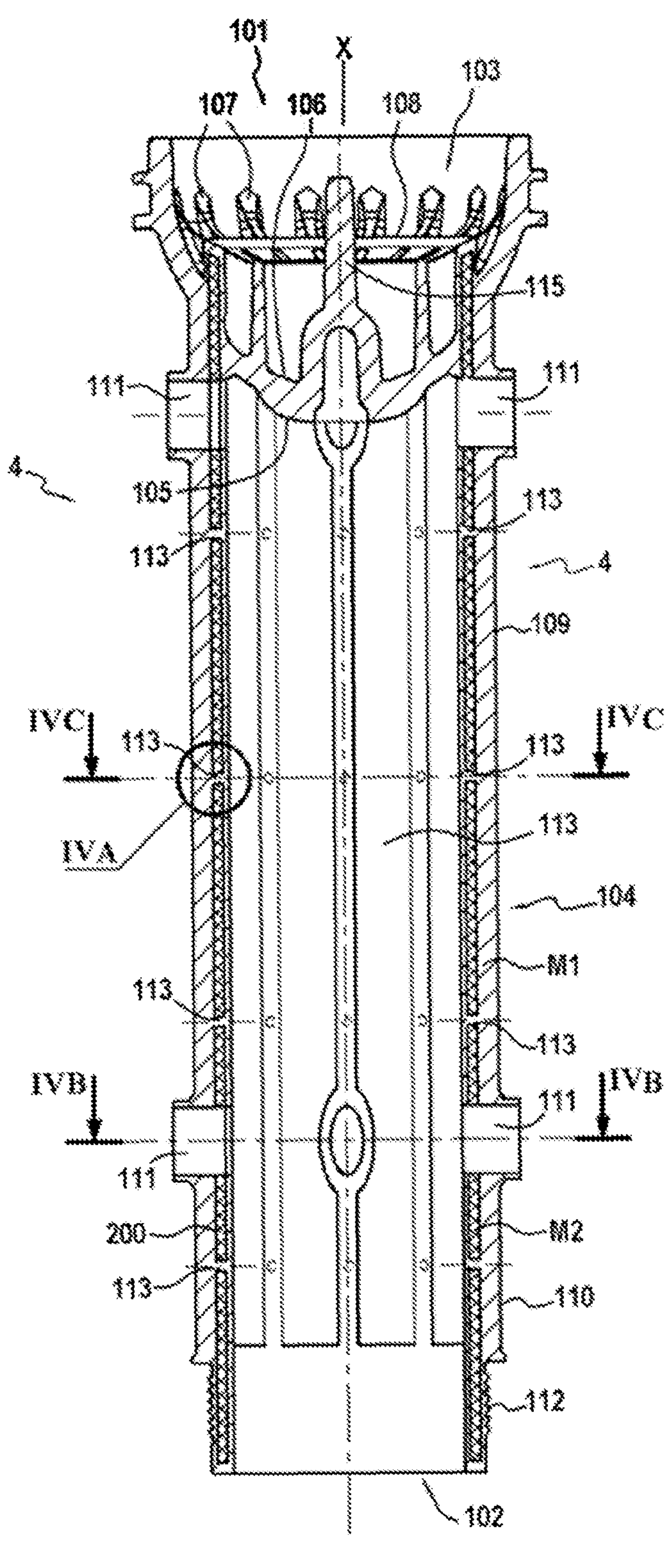

[Fig. 4A]
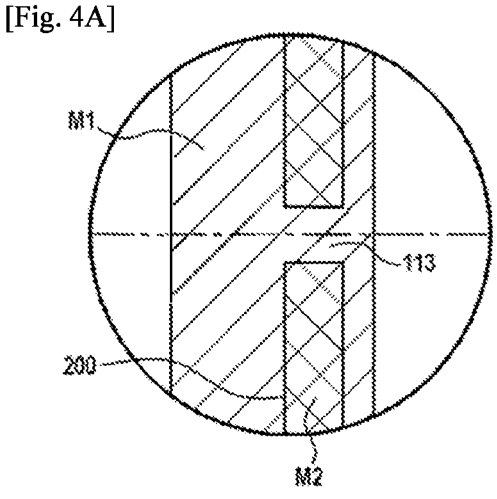
[Fig. 4B]
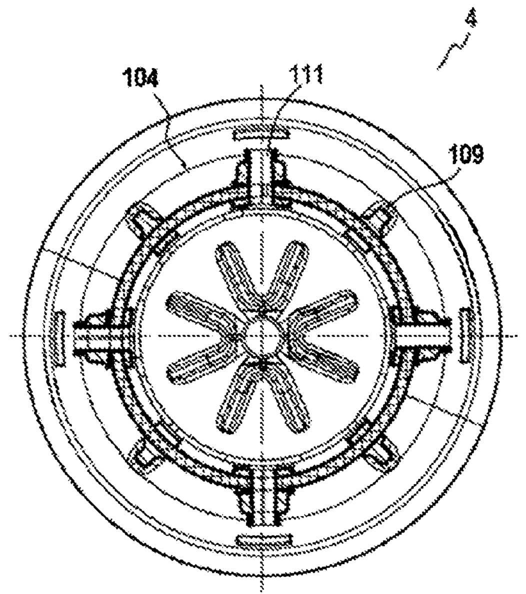

[Fig. 4C]
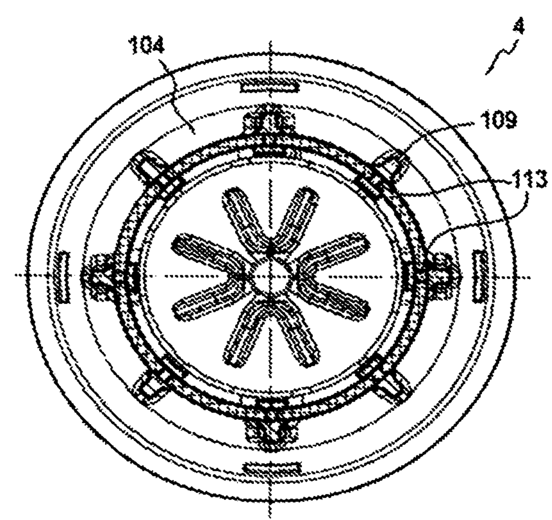
[Fig. 5]
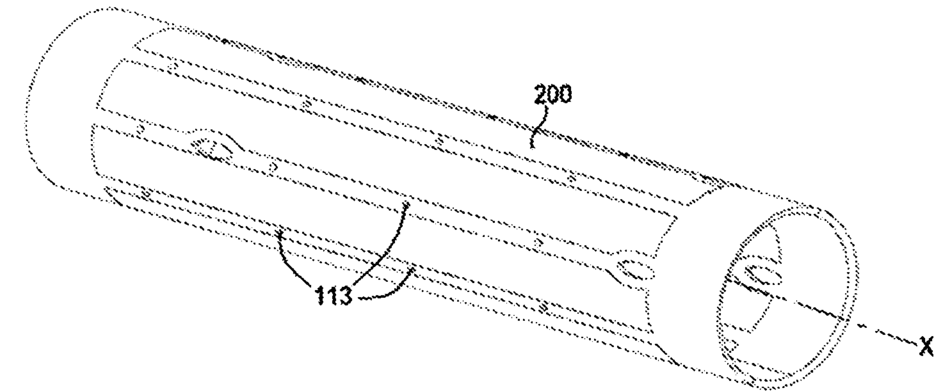

[Fig. 6]
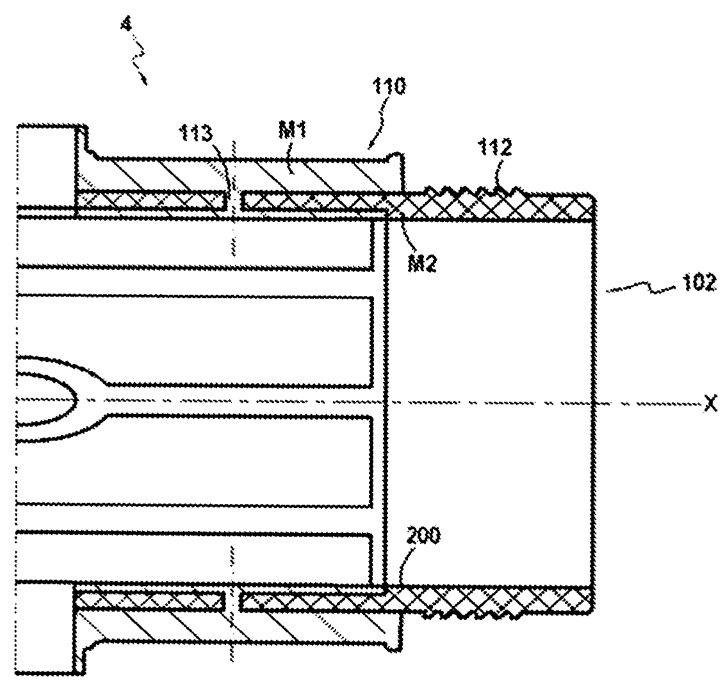

[Fig. 7]
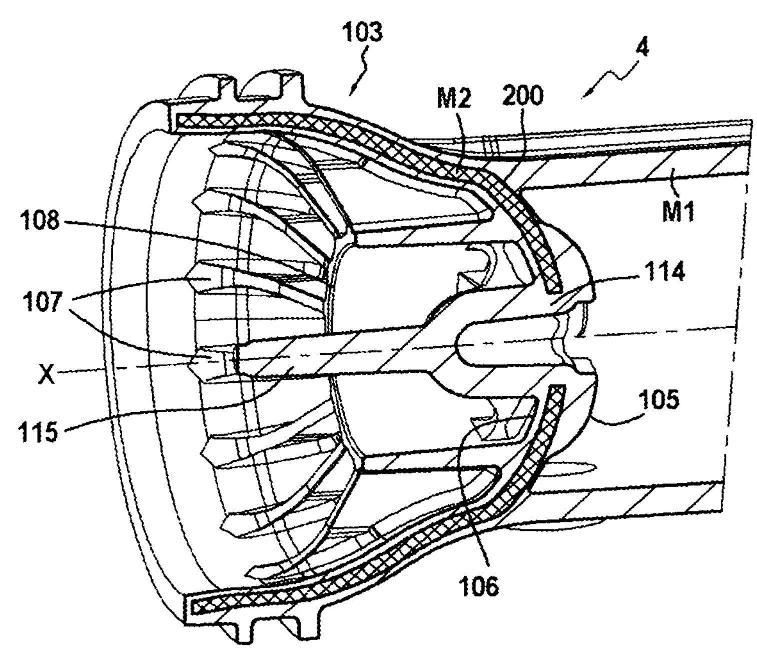
[Fig. 8]
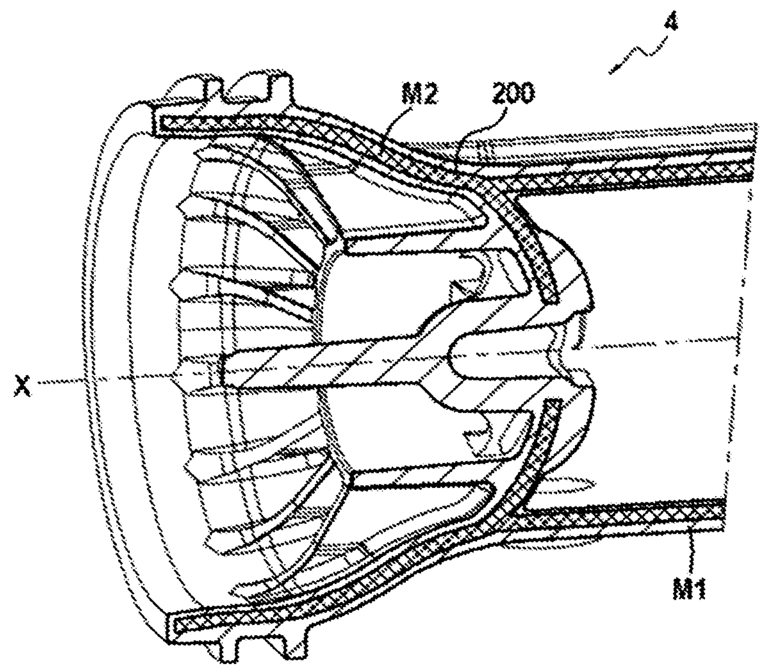

[Fig. 9]
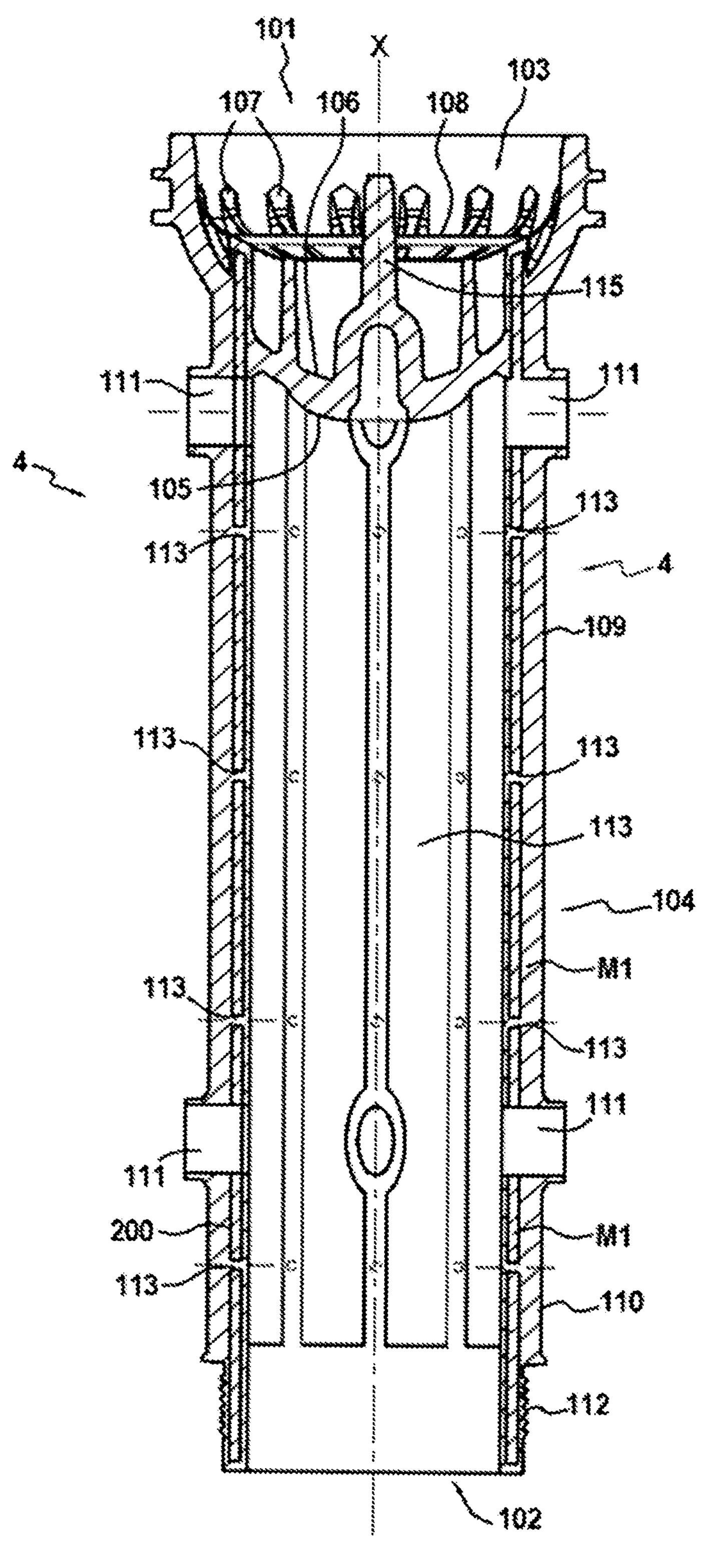

[Fig. 10]
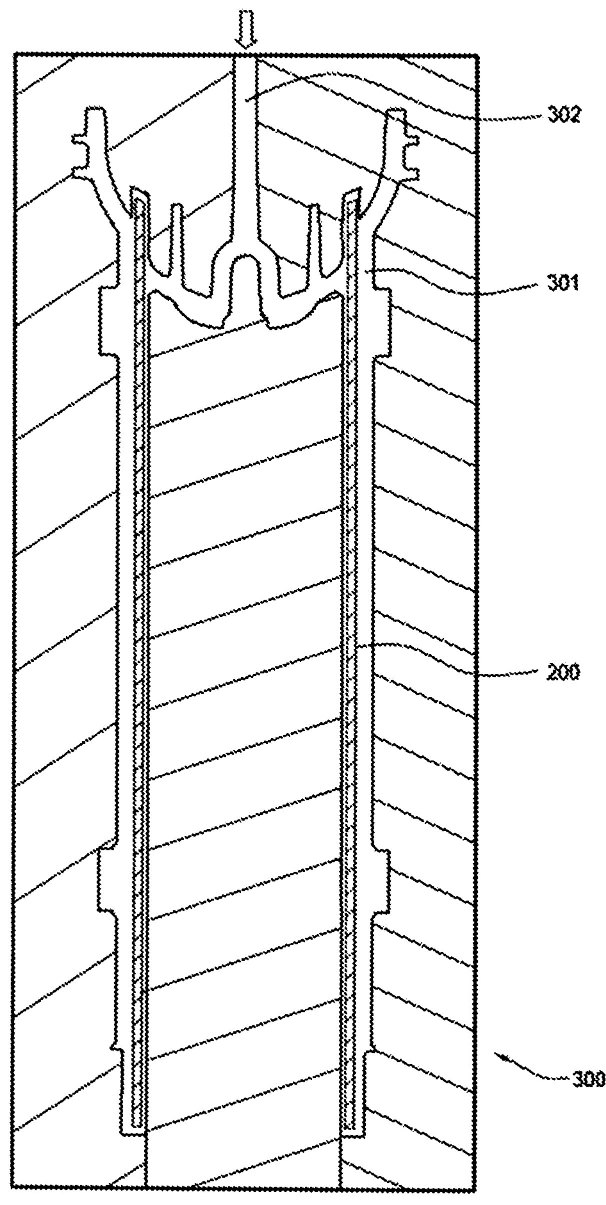

METHOD FOR MANUFACTURING A DIAPHRAGM HOLDER FOR AN OLEO-PNEUMATIC SHOCK ABSORBER

CROSS-REFERENCE TO RELATED APPLICATIONS

This is a National Stage Application under 35 U.S.C. § 371 of International Application No. PCT/FR2022/051471, filed Jul. 22, 2022, now published as WO 2023/012420 A1, which claims priority to French Patent Application No. 2108410, filed on Aug. 2, 2021.

TECHNICAL FIELD

The present invention relates to the field of hydraulic damping and more particularly a method for manufacturing a diaphragm holder for a shock absorber of the oleo-pneumatic type, equipping in particular, though not exclusively, aircraft landing gear, as well as a diaphragm holder which can be obtained by this method.

PRIOR ART

An oleo-pneumatic shock absorber can in particular comprise a rod arranged to slide in the strut and defining with it an internal volume separated into two chambers by a diaphragm integral with said strut. One of the chambers can be filled with a hydraulic fluid while the other can be filled with the same hydraulic fluid and with a pressurized gas. The diaphragm can include calibrated openings through which the hydraulic fluid can pass while being subjected to hydraulic resistance, in order to damp the sliding of the rod in the strut. Oleo-pneumatic shock absorbers can be used in a great number of applications to absorb vibrations and impacts, and in particular in the ground supports of vehicles in motion. Thus, aircraft landing gear can include an oleo-pneumatic shock absorber of this type for absorbing impacts during landing and that of vibrations while rolling on the ground.

Typically, the diaphragm of an oleo-pneumatic shock absorber of this type is carried by a diaphragm holder comprising a first end with a dome, and a tubular portion extending from the dome to a second end intended to receive the diaphragm. When the oleo-pneumatic shock absorber is intended for applications associated with large loads in pressure and compression, as for example in an aircraft landing gear, the diaphragm holder will normally be dimensioned accordingly. Traditionally, diaphragm holders are machined from metal. This can however involve long and expensive operations, and impose minimum limits on the thickness of the material, with negative consequences for the mass and the cost of the diaphragm holder.

In order to solve these problems, alternative materials and manufacturing methods have been proposed. Thus for example, the publication of French patent application FR 2 999 528 A 1 proposed the manufacture by injection of diaphragm holders made of thermoplastic polymers, in order to reduce their mass and manufacturing time, while allowing them to resist the stresses to which they are subjected in applications such as aircraft landing gear, and particularly the buckling of the tubular portion.

Nevertheless, if the use of a thermoplastic polymer, possibly reinforced with short fibers, allows increasing the resistance to buckling while reducing the mass of the diaphragm holder, it is not necessarily the same for other mechanical properties, and particularly for breaking in compression. In addition, the injection manufacturing method imposes dimensional constraints, particularly in terms of the thickness of walls, complicating the structural design of the diaphragm holder.

DISCLOSURE OF THE INVENTION

The present disclosure therefore has as its object to propose a manufacturing method for a diaphragm holder for a shock absorber of the oleo-pneumatic type offering better mechanical resistance with a further reduced mass, as well as a diaphragm holder which can result from this method.

To this end, according to a first aspect of this disclosure, the manufacturing method of the diaphragm holder, which can comprise a first end with a dome, and a tubular portion extending from the dome to a second end, can comprise a step of overmolding a first material onto an insert. This overmolding can in particular be accomplished by injection molding.

Due to the inclusion of the insert and to the overmolding of the first material, it is possible to obtain complex wall thicknesses and geometries, particularly with stiffeners, which could not be easily obtained by injection alone.

In particular, the first material can comprise a thermoplastic polymer, thus allowing overmolding by injection. This thermoplastic polymer of the first material can in particular be a polyether etherketone, the thermo-mechanical properties of which are particularly advantageous for applications in which the diaphragm holder can be subjected to large thermal and mechanical stresses. In order to reinforce its thermoplastic polymer, the first material can also comprise fibers, and particularly fibers with a length less than 1 mm, to facilitate their injection in suspension in the thermoplastic polymer in the liquid state. These fibers can for example be of carbon, a material allowing substantially reinforcing and stiffening the thermoplastic polymer, while reducing its thermal dilation coefficient and being able to confer upon it a high electrical conductivity.

The insert can be a material identical with the first material, which allows obtaining good adhesion in overmolding. However, the insert can alternatively be of a second material, different from the first material, and having a ratio of compression breaking stress to density that is higher than the first material.

The overmolding of the first material onto the second material can thus combine their mechanical properties, and in particular use the first material against buckling, and the second material against compression breaking.

In this case, the second material can in particular comprise a thermoplastic or thermosetting polymer. Thermoplastic polymers, even a common thermoplastic polymer, can therefore be used both as the first material and as the second material, which allows improving the adhesion between the two by welding. In addition, this thermoplastic or thermosetting polymer of the second material can be reinforced with continuous fibers, for example continuous carbon fibers allowing substantially increasing the breaking stress of the second material, at least on one axis. These continuous fibers can for example be braided, wound or deposited in woven or unidirectional layers.

Alternatively, however, the second material can be metallic, for example a steel or a light alloy such as an aluminum alloy. In this case, a thread, particularly for joining the diaphragm to the diaphragm holder, could be arranged on one surface of the insert flush with the second end of the diaphragm holder, the metallic material being particularly suited to receiving such a thread.

A second aspect of the present disclosure relates to the diaphragm holder, for a shock absorber of the oleo-pneumatic type, comprising a first end with a dome, and a tubular portion extending from the dome to a second end, this diaphragm holder including a first material overmolded onto an insert. The insert can in particular extend into the tubular portion of the diaphragm holder to reinforce it in compression along a main axis of the tubular portion. It can then be tubular, and the first material can cover at least partially the insert radially inside and outside to thus maximize its contact surface and therefore its adhesion to the insert.

Alternatively or in addition to extending into the tubular portion of the diaphragm holder, the insert can extend into the dome, so as to reinforce it against crushing.

The insert can moreover having one or more openings through which the first material passes, in order in particular to improve the anchoring of the insert in the first material, as well as to facilitate the flow of the first material during a step of overmolding the first material onto the insert. Thus, for example, the first material, penetrating into one or more radial openings in a tubular wall of the insert, can accomplish a form fitting ensuring the transmission of axial forces between the first material and the insert. On the other hand, an axial opening in the insert, arranged in a central area of the dome, facing an injection port when the insert is located in a mold for overmolding with the first material, can facilitate the flow of the first material around the insert.

The diaphragm holder can moreover have stiffeners in the form of ribs over one or more outer surfaces. In particular, these ribs can comprise longitudinal ribs on an outer surface of the tubular portion to reinforce it against buckling and/or radial and/or cylindrical ribs on an outer surface of the dome to reinforce it against crushing. To further reinforce the tubular portion, the insert can also have longitudinal ribs there aligned with those on the outer surface of the tubular portion.

The diaphragm holder can also have radial openings passing through the tubular portion, to allow the flow of the hydraulic fluid in the oleo-pneumatic shock absorber. The longitudinal ribs can extend around radial openings passing through the tubular portion, in order to reinforce it locally to avoid cracks being able to propagate starting from these radial through openings.

A third aspect of the present disclosure relates to a shock absorber of the oleo-pneumatic type comprising the diaphragm holder of the second aspect.

A fourth aspect of the present disclosure relates to an aircraft landing gear comprising the shock absorber of the oleo-pneumatic type of the third aspect.

BRIEF DESCRIPTION OF THE DRAWINGS

The invention will be well understood and its advantages will be better revealed upon reading the detailed description that follows, of embodiments shown by way of non-limiting examples. The description refers to the appended drawings in which:

FIG. 1 is a schematic view in perspective of an aircraft landing gear.

FIG. 2 is a schematic view in longitudinal section of an oleo-pneumatic shock absorber of the landing gear of FIG. 1.

FIG. 3 is a perspective view of a first embodiment of a diaphragm holder for the shock absorber of FIG. 2.

FIG. 4 is a longitudinal section view of the diaphragm holder in the plane IV-IV of FIG. 3.

FIG. 4A is an enlarged view of the region IVA of FIG. 4.

FIG. 4B is a transverse section view of the diaphragm holder according to the first embodiment in the plane IVB-IVB of FIG. 4.

FIG. 4C is a transverse section view of the diaphragm holder according to the first embodiment in the plane IVC-IVC of FIG. 4.

FIG. 5 is a perspective view of the insert of the diaphragm holder according to the first embodiment.

FIG. 6 is a detail longitudinal section view of a diaphragm holder according to a second embodiment.

FIG. 7 is a detail longitudinal section view of a diaphragm holder according to a third embodiment.

FIG. 8 is a detail longitudinal section view of a diaphragm holder according to a fourth embodiment.

FIG. 9 is a longitudinal section view of a diaphragm holder according to a fifth embodiment.

FIG. 10 is a schematic view of a step of a method for manufacturing the diaphragm holder according to any one of the first to fifth embodiments.

DESCRIPTION OF THE EMBODIMENTS

FIG. 1 shows an aircraft landing gear 10 comprising a shock absorber 20 of the oleo-pneumatic type, which is illustrated in greater detail in FIG. 2. A shock absorber 20 of this type can include a strut 1 in which a rod 2 is mounted sliding along a main axis X. A lower end of the rod 2 can be arranged to receive an axle or a bogie holding one or more wheels 30 and/or other ground support devices, while an upper end of the strut 1 can be mechanically linked to the structure of the aircraft 40. This arrangement, however, can be reversed, with the rod 2 mechanically linked to the structure of the aircraft 40 and the strut 1 holding the ground support device.

The shock absorber 20 can include a diaphragm 3 for separating the interior of the strut 1 and of the rod 2 into a first chamber C1 filled with a hydraulic fluid F and with a gas G under pressure, and a second chamber C2 filled with hydraulic fluid F, as well as a substantially tubular diaphragm holder 4, which can extend, along the main axis X, from a first end 101 coupled to a cap 5 of the strut 1, to a second end 102 holding the diaphragm 3. The second chamber C2 can moreover be delimited by a bottom 6 added to the rod 2. The diaphragm 3 can have calibrated openings 7 to allow the hydraulic fluid F to pass through the first chamber C1 to the second chamber C2 and vice versa. The rod 2, by sliding in the strut 1, can thus cause the volume of the second chamber C2 to vary, thus forcing the movement of hydraulic fluid F between the first chamber C1 and the second chamber C2, with a head loss determined by the calibrated openings 7, so as to damp the relative movement between the rod 2 and the strut 1.

A diaphragm holder 4 according to a first embodiment of the invention is illustrated in greater detail in FIGS. 3 and 4. As can be seen in these figures, this diaphragm holder 4 can comprise a dome 103, located at the first end 101, and a tubular portion 104 extending from the dome 103 to the second end 102. The dome 103 can have a convex inner surface 105, and an outer surface 106 with stiffeners in the form of radial 107 and cylindrical 108 ribs, in order to reinforce it against crushing. The tubular portion 104 can also have stiffeners, in particular in the form of longitudinal ribs 109 over its outer surface 110, in order to reinforce this tubular portion 104 against buckling. In addition, the tubular portion 104 can have radial through openings 111 to allow the circulation of the hydraulic fluid F, or even of the gas G, between the outside and the inside of the diaphragm holder 4 in the first chamber C1 of the shock absorber 10. As illustrated in FIGS. 3 and 4, the openings 111 can be aligned with the ribs 109, so that the ribs 109 reinforce the perimeter of each opening 111 to avoid the propagation of cracks from these openings 111. The outer surface 110 of the tubular portion 104 can also have a thread 112 in proximity to the second end 102 to provide the coupling of the diaphragm holder 4 with the diaphragm 3.

As illustrated in FIG. 4, the diaphragm holder 4 can be formed by a first material M1 overmolded onto an insert 200 of a second material M2. Thus, the second material M2 can be selected to reinforce the diaphragm holder 4 against breaking in compression, particularly with a value of breaking in compression which, divided by the mass density of the material, is greater than that of the first material M1. To allow its overmolding onto the insert 200, the first material M1 can comprise a thermoplastic polymer, such as for example a polyether etherketone (often designated by its English abbreviation PEEK), possibly reinforced with fibers, particularly carbon fibers. In order to allow its overmolding by injection molding, these fibers can be short fibers, i.e. fibers with a length less than 1 mm, for example approximately 0.1 mm in length for 8 μm in diameter. The fibers can for example form 30 or 40% of the mass of the first material M1. The second material M2 can also be a polymer reinforced with fibers. In particular, in order to obtain better resistance to compression, relative to mass density, than in the first material M1, the fibers of the second material M2 can be continuous fibers, for example braided fibers, wound fibers or fibers arranged in unidirectional and/or woven layers. In order to obtain good adhesion to the first material M1, the second material M2 could comprise thermoplastic polymer similar or identical to that of the first material M1. However, given that the shape of the insert 200 could be simpler than that of the complete diaphragm holder 4, and that it could therefore be manufactured by alternative methods to injection, it can also be contemplated to use a thermosetting rather than a thermoplastic polymer. It could even be contemplated to use, as the second material M2, a metallic material, such as for example a steel or a light alloy, particularly an aluminum alloy.

As illustrated in FIG. 4, the insert 200 can in particular extend into the tubular portion 104 of the diaphragm 4, and therefore itself be tubular. In particular, in order to maximize the contact surface and therefore the adhesion between the first material M1 and the second material M2, the insert 200 can be embedded in the first material in such a manner that the first material M2 covers at least partially the second material M2 both on the outer surface 110 of the tubular portion 104 and on its inner surface 113. The insert 200 can nevertheless be at least partially flush through the first material M1. Thus, as illustrated in FIGS. 3, 4, 4B and 4C, in order to limit the mass of the diaphragm carrier 4, the first material M1 can be perforated on the inner and/or outer surfaces 113, 110 of the tubular portion 104, so as to allow the insert 200 to partially appear.

As illustrated in FIGS. 4B, 4C and 5, the insert 200 itself can have longitudinal ribs 120, embedded in the longitudinal ribs 109 of the diaphragm carrier 4. The adhesive link of the first material M1 with the insert 200 can also be reinforced with a form-fitting link by forming, in the insert 200, radial openings 113, which the first material M1 passes through, as is more clearly visible in FIG. 4A. In particular, as illustrated in FIGS. 4, 4A and 4C, these radial openings 113 can be located on longitudinal ribs 109. They can have a diameter d of, for example 10 mm.

A second embodiment is illustrated in FIG. 6, in which the insert 200 can be flush with the outer surface 110 of the diaphragm holder 4 in proximity to the second end 102, so as to allow the formation of the thread 112 on the exposed surface of this second material M2, in particular when this second material M2 is metallic. The other elements of the diaphragm holder according to this second embodiment can be identical, or at least equivalent to those of the diaphragm carrier 4 according to the first embodiment, and consequently receive the same labels in FIG. 6 as in the preceding figures.

A third embodiment is illustrated in FIG. 7, in which the insert 200 can extend into the dome 103 in order to reinforce it against crushing. In this case, the insert 200 can have an axial through opening 114, located in particular in a central area of the dome 103, which can be substantially aligned with an injection gate 115 on the outer surface 106 of the dome 103, in order to facilitate the flow of the first material M1 on the internal 105 and external 106 surfaces of the dome 103 during its overmolding onto the insert 200. The other elements of the diaphragm according to this third embodiment can be identical, or at least equivalent to those of the diaphragm holder 4 according to the preceding embodiments, and consequently received the same labels in FIG. 7 as in the preceding figures.

It can naturally also be contemplated to combine the features of the third embodiment with those of the first or of the second embodiments to obtain a fourth embodiment, in which the insert 200 extends within the dome 103 and within the tubular portion 104, as illustrated in FIG. 8. The other elements of the diaphragm holder 4 according to this fourth embodiment can be identical, or at least equivalent to those of the diaphragm holder 4 according to the preceding embodiments, and consequently receive the same labels in FIG. 8 as in the preceding figures.

The insert is not necessarily of a second material M2 different from the first material M1, but can also be of an identical material. Thus, in a fifth embodiment illustrated in FIG. 9, the insert 200 is of material identical to the first material M1. The other elements of the diaphragm holder according to this fifth embodiment can be identical, or at least equivalent to those of the diaphragm holder 4 according to the first embodiment, and consequently receive the same labels in FIG. 9 as in the preceding figures. It can also naturally be contemplated to combine the features of this fifth embodiment with those of each of the second to fourth embodiments.

In each of these embodiments, the diaphragm holder 4 can be manufactured according to a method comprising a step of overmolding the insert with the first material. If the insert is of polymer reinforced with continuous fibers, it can in particular have been manufactured by braiding, winding and/or stacking, while if the insert is metallic, it can for example have been manufactured by extrusion, rolling, machining and/or additive manufacturing. If the insert is of material identical to the first material, and particularly if this first material is a thermoplastic polymer possibly reinforced with short fibers, the insert can even have been manufactured by injection molding. Overmolding with the first material M1 can then be carried out by placing the insert 200 in a mold 300 with a cavity 301 having the net shape of the diaphragm holder 4, as illustrated in FIG. 10, and by injecting the first material M1 into it through an injection port 302 which can be aligned with said central area of the dome 103, thus forming the injection gate 115. After the solidification of the first material M1, the diaphragm holder 4 can be removed from the mold.

Although the present invention has been described by referring to specific exemplary embodiments, it is obvious that different modifications and changes can be carried out on this example without departing from the general scope of the invention as defined by the claims. Consequently, the description and the drawings must be considered in an illustrative, rather than a restrictive sense.

The invention claimed is:

1. A method for manufacturing a diaphragm holder for an oleo-pneumatic shock absorber, the diaphragm holder comprising a first end with a dome, and a tubular portion extending from the dome to a second end, the method comprising a step of overmolding a first material onto an insert.

2. The method for manufacturing a diaphragm holder according to claim 1, wherein the insert is of a second material, different from the first material and having a higher ratio of compression breaking stress to density than the first material.

3. The method for manufacturing a diaphragm holder according to claim 2, wherein the second material comprises a thermoplastic or thermosetting polymer reinforced with continuous fibers.

4. The method for manufacturing a diaphragm holder according to claim 2, wherein the second material is metallic.

5. The method for manufacturing a diaphragm holder, according to claim 1, wherein the insert is of a material identical to the first material.

6. The method for manufacturing a diaphragm holder according to claim 1, wherein the first material comprises a thermoplastic polymer, such as for example a polyether etherketone.

7. The method for manufacturing a diaphragm holder according to claim 6, wherein the first material comprises fibers with lengths smaller than 1 mm, of carbon for example, embedded in the thermoplastic polymer of the first material.

8. A diaphragm holder for an oleo-pneumatic shock absorber, the diaphragm holder comprising a first end with a dome, and a tubular portion extending from the dome to a second end, wherein it includes a first material overmolded onto an insert.

9. The diaphragm holder according to claim 8, wherein the first material comprises a thermoplastic polymer, such as for example a polyether etherketone.

10. The diaphragm holder according to claim 9, wherein the first material comprises fibers with a length less than 1 mm, of carbon for example, embedded in the thermoplastic polymer of the first material.

11. The diaphragm holder according to claim 8, wherein the insert is of a second material, different from the first material, and having a higher ratio of compression breaking stress to density than the first material.

12. The diaphragm holder according to claim 11, wherein the second material comprises a thermoplastic or thermosetting polymer reinforced with continuous fibers.

13. The diaphragm holder according to claim 11, wherein the second material is metallic.

14. The diaphragm holder according to claim 8, wherein the insert is of a material identical with the first material.

15. The diaphragm holder according to claim 13, with a thread on a surface of the insert flush with the second end of the diaphragm holder.

16. The diaphragm holder according to claim 8, wherein the insert extends into the tubular portion of the diaphragm holder.

17. The diaphragm holder according to claim 16, wherein the insert is tubular and the first material covers, at least partially, the insert radially inside and outside.

18. The diaphragm holder according to claim 8, wherein the insert extends into the dome.

19. The diaphragm holder according to claim 8, wherein the insert has one or more openings through which the first material passes.

20. The diaphragm holder according to claim 8, with ribs on one or more outer surfaces.

21. An oleo-pneumatic shock absorber comprising the diaphragm holder according to claim 8.

22. An aircraft landing gear comprising the oleo-pneumatic shock absorber according to claim 21.

* * * * *